Patented Sept. 8, 1925.

1,552,728

UNITED STATES PATENT OFFICE

SAMUEL PEACOCK, OF WHEELING, WEST VIRGINIA, ASSIGNOR TO WILLIS G. WALDO, OF WASHINGTON, DISTRICT OF COLUMBIA.

PRODUCTION OF ELEMENTAL ALUMINUM.

No Drawing. Application filed December 8, 1921, Serial No. 520,995. Renewed July 18, 1925.

*To all whom it may concern:*

Be it known that I, SAMUEL PEACOCK, a citizen of the United States, residing at Wheeling, in the county of Ohio and State of West Virginia, have invented certain new and useful Improvements in the Production of Elemental Aluminum; and I do hereby declare the following to be a full, clear, and exact description of the invention, such as will enable others skilled in the art to which it appertains to make and use the same.

This invention relates to a process of producing aluminum and has for its object to provide a procedure which will be more simple and less costly in carrying out than those heretofore proposed.

With this and other objects in view, the invention consists in the novel steps and combinations of steps constituting the process, all as will be more fully hereinafter disclosed and particularly pointed out in the claims.

In carrying out this invention, one may take any naturally occurring aluminum silicate, such for example, as clay or kaolin and mix therewith in chemically combining quantities carbon and sodium chloride. The charge thus produced is heated in a suitably arranged closed furnace, to a temperature of about 1400° C. whereupon a reaction in accordance with the following equation will take place:

(1) $Al_2Si_2O_7 + 6NaCl + 3C =$ 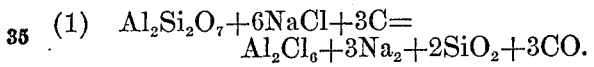

The aluminum chloride $Al_2Cl_6$ having a low boiling point, will be sublimed off from the charge as rapidly as it is formed. The sodium will first unite with the silica to form sodium silicate but at the high temperature of the reaction where it is free as an oxide or as a silicate and in contact with coke, any sodium oxide or sodium silicate that may be formed will be immediately reduced to elemental sodium and silica, thus liberating carbon monoxide.

The elemental sodium thus formed boils freely at about 1200° C., hence at the temperature at which the aluminum chloride is formed (1400° C.) said sodium is vaporized and readily escapes along with said aluminum chloride from the solid portion of the furnace charge out into the reaction chamber. The atmosphere of the reaction zone, therefore, is composed of the vapors of aluminum chloride, elemental sodium and carbon monoxide. But sodium and aluminum chloride will react with each other in accordance with the following equation:

(2) $Al_2Cl_6 + 3Na_2 = 2Al + 6NaCl.$

Although the boiling point of elemental aluminum is about 2200° C. yet, the above mentioned reaction will take place in the furnace chamber and the products of said reaction, aluminum and sodium chloride, will remain in the form of sublimates sufficiently long to be carried over and collected in a condensing chamber, in a manner analogous to the collection of the well known zinc blue powder in a retort condenser. The temperature of this condensing chamber is preferably maintained at about 1000° C. or at a temperature too high to permit any considerable proportion of the carbon monoxide present in the furnace chamber to effect a reversion of the reaction.

That is to say, if the temperature of the condenser were not high enough the following reactions might occur:

(3) $6CO = 3CO_2 + 3C$ and 

(4) $Al_2 + 3CO_2 = Al_2O_3 + 3CO.$ 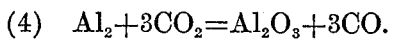

The sodium chloride produced in accordance with equation (2) melts at about 800° C. and vaporizes at about 1500° C. Hence, as fast as it is led into the condensing chamber it liquefies with the elemental aluminum which has only a slightly lower melting point, and as the density of elemental aluminum is 2.66, while that of sodium chloride is 2.17, the molten sodium chloride in said condensing chamber floats on the molten aluminum to serve as a protection layer for the latter.

The aluminum thus produced is of exceptional purity, because the silica and iron oxide usually contained in the kaolin or clay employed do not form volatile compounds with sodium chloride in the presence of carbon.

More or less silicon carbide or oxycarbide is formed, and the iron oxides present are reduced to elemental iron preliminary to forming the very stable iron carbide $Fe_3C.$ It is possible that at the temperature employed some silica may be reduced to elemental silicon by momentary contact with elemental sodium. But such contingency will not cause silicon contamination of the elemental aluminum product produced, because the vaporizing temperature of elemental silicon is about 2300° C. and hence any silicon thus formed would remain in the solid furnace charge.

Sodium oxide vaporizes at about 1100° C. and as it is formed by the aluminum chloride reaction at about 1400° C. it volatilizes instantly upon its formation. But when it escapes from the solid portion of the furnace charge, it contacts with white hot carbon or coke, which during the furnacing operation is present as a layer several inches thick on top of the still unexhausted furnace charge of kaolin, coke and sodium chloride, and it is therefore reduced. Accordingly, ample provision is made for the carbon reduction of all sodium oxide that may be formed, and elemental sodium is not at any time in solid contact with the unexhausted furnace charge. Hence, the possibility of the silica being reduced by means of such elemental sodium becomes practically very remote. Therefore, by this process, one is enabled to produce directly from crude aluminous minerals elemental aluminum of exceptional purity.

What I claim is:

1. The process of making aluminum which consists in providing a mixture of aluminum silicate, an alkali metal chloride and carbon; heating said mixture to a temperature sufficient to react on said aluminum silicate with said alkali metal chloride in the presence of said carbon to evolve aluminum chloride and elemental sodium in the form of sublimates; causing said sublimates to react to form metallic aluminum and sodium chloride; and separating said aluminum from said chloride, substantially as described.

2. The process of making metallic aluminum from an aluminum silicate which consists in mixing said silicate with an alkali metal chloride and a reducing agent; heating the mixture to a reacting temperature to sublime off aluminum chloride and elemental sodium; causing said chloride and elemental sodium to react to form a vapor of sodium chloride; condensing said vapor; and recovering said aluminum, substantially as described.

3. The process of making metallic aluminum which consists in reacting in a closed furnace on an aluminum silicate with sodium chloride in the presence of a reducing agent to produce the mixed vapors of aluminum chloride and elemental sodium in said furnace; permitting said vapors to react to form elemental aluminum and sodium chloride; condensing said last named vapor outside the furnace; and recovering the resulting metallic aluminum, substantially as described.

In testimony whereof I affix my signature.

SAMUEL PEACOCK.